Dec. 20, 1966  C. G. SCHMITT  3,293,582
ELECTRICAL DEVICE AND METHOD OF MAKING THEREOF
Filed Aug. 6, 1963
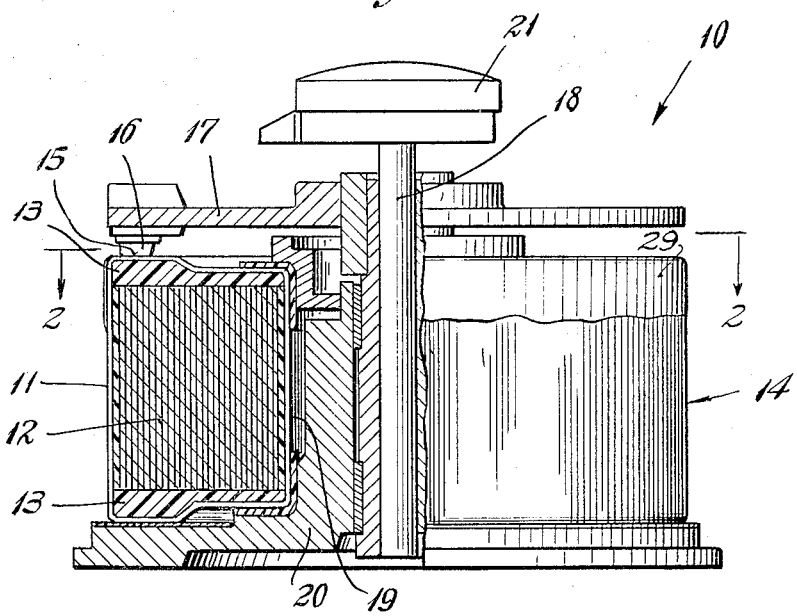
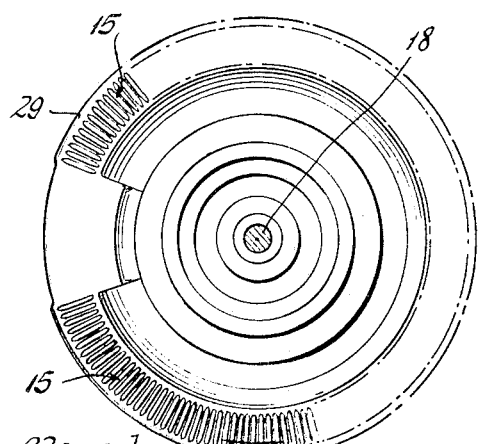
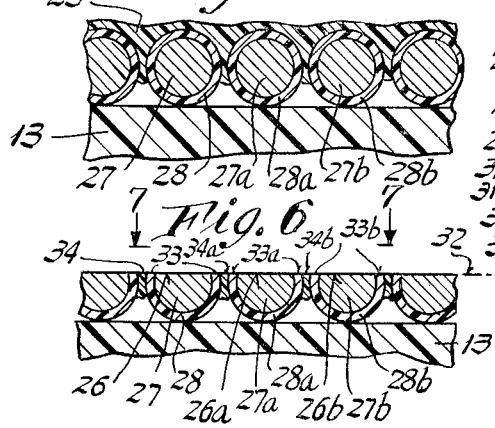
INVENTOR.
Clifford G. Schmitt
BY
Johnson and Kline
ATTORNEYS United States Patent Office 3,293,582
Patented Dec. 20, 1966

3,293,582
ELECTRICAL DEVICE AND METHOD OF MAKING THEREOF
Clifford G. Schmitt, Bristol, Conn., assignor to The Superior Electric Company, Bristol, Conn., a corporation of Connecticut
Filed Aug. 6, 1963, Ser. No. 300,246
5 Claims. (Cl. 336—149)

The present invention relates to electrical devices having a commutating surface on which a contact brush is relatively movable in electrical engagement therewith and more particularly to such devices and the making thereof in which the commutating surface is formed by similar portions of a conducting wire.

When electrical conduction is desired between two parts that are to be relatively movable with respect to each other, it is a common expedient to form a commutating surface on one part and to provide a brush on the other part. The commutating surface in many instances is formed of electrical conducting flat segments that are electrically insulated from each other and positioned in the path of movement of the brush. In other instances it may be formed on turns of a winding by removing the insulation covering from a similar portion of each turn of the winding to expose the wire conductor. If the wire is round, the exposed portions are generally shaped to conform to the path of the movement of the brush as by making a secant on each turn to provide a commutating surface that is flat when the brush moves in a plane or by making an arc on each turn to have the commutating surface arcuate if the brush moves in an arc to thereby produce a suitable commutating surface.

One electrical device that has shaped, exposed portions of a plurality of adjacent turns of a winding formed to provide a commutating surface is an adjustable voltage autotransformer. The autotransformer includes a closed core formed of magnetic material on which insulation covered conducting wire is wound in turns to form a winding. A brush is mounted for movement to be in electrical and mechanical engagement with the exposed portions of the turns. While such devices have been found satisfactory there has, however, been a tendency for the edges of the insulation covering of the turns in the exposed portion thereof that form the commutating surface to become unbonded to the conductor, i.e. feather, which may prevent proper contact between the brush and the exposed portion by the feathered part rising above and coming between the brush and the exposed portions. Another factor, in such a device, is that heat developed during electrical conduction in the area of contact of the brush and the commutating surface may cause the contacted turns to shift or be displaced above the commutating surface and by remaining displaced also interfere with the movement of the brush thereover and the electrical conduction therebetween.

It is accordingly an object of the present invention to provide a method for making a commutating surface for an adjustable voltage autotransformer which overcomes the above-noted possibilities of malfunctioning by substantially minimizing feathering of the edges of the insulation and the displacing of a few turns above the commutating surface.

Another object of the present invention is to provide a method of making a commutating surface on similar portions of a plurality of adjacent turns of a winding with the winding being formed from a length of wire on a closed magnetic core that achieves the above-noted object.

A further object of the present invention is to provide an adjustable voltage autotransformer which is capable of controlling a higher quantity of electrical power than in similar sized presently known autotransformers without malfunctioning, which is mechanically stronger and capable of withstanding shock conditions, has better overload characteristics and is durable in use.

Other features and advantages will hereinafter appear.

In the drawing:

FIGURE 1 is an elevational view of an adjustable voltage autotransformer in which the present invention is incorporated with the autotransformer being partly cut away and in section to show details thereof.

FIG. 2 is a section taken on the line 2—2 of FIG. 1.

FIG. 3 is an enlarged section taken on the line 3—3 of FIG. 2 showing a part of the commutating surface portion of the winding.

FIG. 4 is a section similar to FIG. 3 of the commutating surface portion at one stage of its manufacture according to the present invention.

FIG. 5 is a section similar to FIG. 4 of the commutating surface portion at a further stage of manufacture.

FIG. 6 is a section similar to FIG. 5 of the commutating surface portion at a subsequent stage in its manufacture according to the method of the present invention.

FIG. 7 is a view taken on the line 7—7 of FIG. 6.

Referring to the drawing, the present invention has particular utility in an adjustable voltage autotransformer, generally indicated by the reference numeral 10, and in the particular embodiment shown includes an annular coil 11. The coil is formed by spirally winding a strip of magnetic material into an annular core 12, positioning at each end an end form 13 and then winding about the core and end forms a length of electrical conducting wire to form a winding 14. Though the winding is shown as a single layer herein, it will be appreciated that a multiple layer may be employed if desired.

While it is known in adjustable voltage autotransformers to provide a commutating surface on the circular periphery of the winding 14, in the present embodiment described herein, a commutating surface 15 is formed on the top axial end of the coil 11. A brush 16 which may be of the conventional electrical conducting carbon type is mounted on a radiator 17 that is secured to a shaft 18 which extends through an axial through opening 19 of the coil 11. The shaft is mounted for rotational movement with respect to the coil 11 on a base and bearing member 20 and has a knob 21 secured thereon to facilitate rotational movement of the shaft 18, the radiator 17 and hence the brush 16. The brush accordingly is capable of being moved arcuately in a plane and the commutating surface 15 accordingly is arcuate, having a planar contour which corresponds to the path of movement of the brush so that the brush, substantially throughout its path of movement, is engageable with the commutating surface. As shown in FIG. 2, the commutating surface extends through an arc of approximately 320°.

The commutating surface 15, as shown in FIGS. 3–7, is formed on similar portions 22, 22a, 22b, etc. of each turn 23, 23a, 23b, etc. of a plurality of adjacent turns that constitute part of the winding 14. Specifically the top surface 24, 24a, 24b, etc. of a conducting layer 25, 25a 25b, etc. constitutes the commutating surface 15 and the conducting layer is bonded to a formerly exposed face 26, 26a, 26b, etc. of a conductor 27, 27a, 27b, etc. of each turn having a layer 28, 28a, 28b, etc. of electrical insulation thereon. The top surface 24, 24a, 24b, etc., while it may be arcuate if the commutating surface is formed on the periphery of the winding 14, here, in the specific embodiment of the invention, it is flat as the brush 16 is mounted for planar movement in a plane parallel to the plane in which the top surfaces 24, 24a, 24b, etc. lie.

In carrying out the present invention there is provided on the coil at least in the area of the portions 22, 22a, 22b, etc. where the commutating surface is formed, a covering of hardened plastic material that is generally indicated by the reference numeral 29. This covering, as shown in FIG. 3, fills at least the upper part of the interstices between the portions, as indicated by the reference numerals 30, 30a, 30b, etc.

The covering 29 is relatively thick and made of electrically insulating material that maintains its strength at relatively high temperatures. One example of such a material is a silicone epoxy type XR–6–4505 available from the Dow Corning Corporation of Midland, Michigan. As will be hereinafter understood, the covering 29 is applied so that it covers not only the area of the coil where the commutating surface is formed but in addition extends to adjacent areas of the coil. Thus in the finished device 10 it forms a continuous covering over a part of the coil with substantially only the commutating surface being uncovered and exposed.

In carrying out the method of the present invention to form the above-described commutating surface of the adjustable voltage autotransformer, the coil 11 is initially formed by toroidally winding about the core 12 and end forms 13 a length of wire having a conducting part which is circular in cross-section and is covered with electrical insulation layers, the former producing the conductors 27, 27a, 27b, etc. and the latter the insulation layers 28, 28a, 28b, etc. Generally while the invention is not to be considered as being limited solely thereto, the winding 14 is a single layer winding and the turns are closely spaced thereon at least in the area where the commutating surface 15 is formed but have, by reason of the wire being circular, interstices 31, 31a, 31b, etc. that exist between the upper portions of the turns. A cross-section through similar portions 22, 22a, 22b where the commutating surface is formed on such a coil at the stage after the above steps have been performed that finally becomes the commutating surface is shown in FIG. 4 with the conductors being indicated by the reference numerals 27, 27a, 27b, etc. The conductors 27, 27a, 27b, etc. are each circular and the electric insulation layers 28, 28a, 28b, etc. constitute a thin layer that is bonded to the exterior of the conductors and may be a varnish or hardened plastic material. In addition, there are between the portions 22, 22a, 22b, etc. interstices 31, 31a, 31b, etc. One example of a material forming the layers 28, 28a, 28b, etc. is sold under the trade name "M.L." and is available from many major insulated wire suppliers.

In accordance with the present invention the coil, as above described, is covered at least in the area of the commutating surface by the covering 29 with the similar portions 22, 22a, 22b, etc. being shown in cross-section after the application of the covering 29, in FIG. 5. It will be appreciated that the covering 29 is of sufficient thickness to fill the interstices 31, 31a 31b, etc. existing between the turns 23, 23a, 23b, etc of the winding but also to almost completely hide the identity of the individual turns. While the covering may be applied by spraying a powder of the heretofore mentioned material onto a coil that has been heated beyond the sintering temperature of the material, it is however preferably applied to the coil by use of a process known as a fluidized-bed coating process. This consists of providing a fluidized bed of particles of the material and depositing a heated coil therein for sufficient time to permit a covering of the desired thickness to be formed on the coil and then withdrawing the coil with the covering thereon and cooling the same to harden the material.

With such a manner of applying the covering 29, it may at times be found desirable to completely cover the coil with the covering 29. However, the present invention provides for at least covering the area of the coil on which the commutating surface is formed and the area adjacent thereto. Thus, as shown in FIG. 1, the covering 29 may extend perhaps ⅓ of the height of the coil along the inner and outer peripheries thereof in addition to covering the top radial surface on which the commutating surface 15 is formed.

After applying the covering to the above-noted area of the coil which includes the similar portions 22, 22a, 22b, etc. where the commutating surface is formed, the next step is to remove from the similar portions 22, 22a, 22b, etc. of each of the turns in the commutating surface only part of the covering, the insulation layer and part of the conductor. As shown in FIG. 6, the removal is along a surface 32 and as each of the conductors 27, 27a, 27b, etc. is circular in cross-section and hence, in effect, a secant is cut from each. Thus there is provided a surface 32 defined by the exposed faces 26, 26a, 26b, etc. of the conductors 27, 27a, 27b, etc., faces 33, 33a, 33b, etc. of the insulation layers 28, 28a, 28b, etc. and faces 34, 34a, 34b, etc. of the covering 29 in the interstices 31, 31a, 31b, etc.

The final step in the method of making the commutating surface of the present invention is to bond to the exposed surfaces 26, 26a, 26b, etc. of each of the turns in the commutating surface an electrical conducting material which while it may be of the same material as the conductors 27, 27a, 27b, etc., is preferably substantially non-corrosive; such a plating material may be rhodium, gold, silver, platinum, etc. or combinations thereof. The bonding is preferably effected by an electrolytic bath method and it will be appreciated that the plating material is thus only applied to just the exposed face 26, 26a, 26b, etc. of each of the conductors and constitutes the conducting layer 25, 25a, 25b, etc. According to the present invention, the conducting layer is deposited sufficiently thick so that the top surfaces 24, 24a, 24b, etc. of the layer lie above the surface 32. As the top surfaces 24, 24a, 24b, etc. form the commutating surface 15 on which the brush rides and as the brush is at least wide enough to engage two adjacent turns, the brush therefore only engages the top surfaces 24, 24a, 24b, etc. and thus cannot according to the present invention engage the faces 33, 33a, 33b, etc. of the insulation layer and the faces 34, 34a, 34b, etc. of the covering 29.

As heretofore mentioned, one problem that has arisen through the use of insulation covering wire formed to provide a commutating surface was that the insulation at least adjacent the edges thereof may become unbonded to the conductor and hence tend to feather or rise up above the commutating surface. Thus when the brush moves thereover, the brush may engage the insulation and rise out of electrical contact with the commutating surface. The present invention obviates such an occurrence of malfunctioning by causing the covering to fill the interstices that exist between each closely spaced turn and thus insulation layer 28 is prevented from moving even if it does become unbonded to the conductor.

It will be further appreciated that in an adjustable voltage autotransformer the turn or turns which the brush contacts when electric power is being controlled by the autotransformer has a tendency to heat and become hotter than the adjacent parts of the autotransformer. This may cause not only a displacement of the turns but a rapid oxidation of the insulation layer. The present invention obviates such an occurrence and malfunctioning that may be cause therefrom by the covering serving as a binder to lock each of the turns in place against detrimental individual movement. Thus, as shown in FIG. 7, the covering 29 filling the interstices 31, 31a, 31b forms an integral part of the continuous covering 29. If, during use, one or two similar portions tended to rise above the commutating surface, the covering not only acts to restrain the portions but in addition, if the portions rise, the covering causes adjacent portions to also rise. Accordingly instead of just one or two turns becoming displaced, many are, with the result that though there is in effect a hump on the commutating surface, it is gradual rather than abrupt and thus still usable. Additionally, after the turns have cooled and dropped, the covering causes them to resume their previous position rather than become shifted. It will be appreciated that the covering by not engaging the core in the area of the commutating surface is thus not bonded thereto and hence its movement is not inhibited.

The insulation layer of the wire except in the small exposed faces 33, 33a, 33b has generally prevented short circuits between the turns. If, however, the insulation layers become oxidized and deteriorate and the turns become displaced by the brush or otherwise then short circuits will result as has happened during overload conditions. The covering of the present invention, as it is between turns in the commutating portion, acts to insulate the turns and maintain them separated and thus even if oxidation of the insulation layer does occur, a short circuit will not result. It has been found that the use of the covering applied in the method above described and at least to the areas mentioned in an adjustable voltage autotransformer enables an autotransformer to withstand physical shock which may cause displacement of the turns by the binding of the turns together at least in the area where the commutating surface is formed; and increases the temperature stability of the autotransformer. Moreover, such results are achieved in a manner which does not interfere with the operation of the brush on the commutating surface.

The specific examples of material heretofore mentioned of the covering and insulation layer provide a bonding of the covering to the layer in addition to the bonding of the layer to the conductor, the latter being copper. In the drawing the thickness of the insulation layer is shown somewhat exaggerated for clarity as is also the conducting layer 25, which may have a thickness of 125 millionths of an inch.

Of particular importance, the present invention increases the ability of the autotransformer to withstand corrosive environmental conditions, as proven by salt spray tests. It has been found that corrosive material would enter between the insulation layer and the wire and corrode the copper wire beneath the plating material. However, the present invention substantially increases the resistance to corrosion by preventing such occurrence by reason of the covering mechanically maintaining the insulation 28 against the wire to prevent separation thereof that would permit the entrance of corrosive material.

It will accordingly be appreciated that there has been disclosed a commutating surface for use in electrical devices and particularly an adjustable voltage autotransformer. The commutating surface is formed on a surface of the coil of the autotransformer which corresponds to the path of movement that the brush has so that it may ride in electrical engagement thereon. A commutating surface, according to the present invention, has been found to enable an autotransformer to control more power than previous devices of similar size by reason of it being able to be operated at somewhat higher temperatures without detriment and thus have a better overload characteristic. Moreover, the present invention provides for not only physically holding each of the wires in place by use of a hardened covering but also utilizes the covering for minimizing deterioration of the insulation layer and obviating detrimental effects therefrom if such occur.

Variations and modifications may be made within the scope of the claims and portions of the improvements may be used without others.

I claim:

1. The method of forming a commutating surface having a contour corresponding to a path of movement of a conducting brush that rides thereon in electrical engagement therewith comprising the steps of forming a coil by providing a core on which a length of wire having a conductor covered with an electrical insulation layer is wound to form a winding composed of at least a plurality of winding turns approximating said contour with interstices between turns, forming a relatively thick hardened coating on at least the part of said coil where the commutating surface is to be located and adjacent thereto to bond the plurality of turns together, said coating substantially filling the interstices and being formed sufficiently thick to render the turns at the portion of the coil substantially indistinct and normally being free of the core within the interstices, removing to a surface somewhat approximating the commutating surface the coating and insulation layer and a portion of the conductor from similar portions of each of the plurality of the winding turns to form an exposed similar portion of the conductor of each of said turns with the covering still remaining in the interstices below the surface, and bonding to the exposed portions a conducting material having an outer surface that forms the commutating surface with the commutating surface being above and parallel to the surface to which the coating and insulating layer are removed.

2. An electrical device comprising a coil having a commutating surface formed thereon corresponding to a path of movement of a brush movable on said commutating surface in electrical engagement therewith, said coil comprising a closed core of magnetic material, a length of conducting wire having an insulation layer thereover wound on said core to form a plurality of winding turns, at least some of said winding turns having a similar portion with interstices between the portions, each of said similar portions having a face of the conductor and a face of the insulation layer surrounding the face of the conductor, a hardened relatively thick covering on an area of said coil including and adjacent to at least the similar portions to substantially fill the interstices, said covering having a face surrounding the face of the insulation layer and forming a contiguous covering except for the faces of the conductor and insulation layer, and a conducting material bonded to the face of the conductor and having an outer surface defining the commutating surface, the faces of the conductor, insulation layer and covering lying on a surface that is parallel to and below the commutating surface and normally being free of the core within the interstices.

3. The invention as defined in claim 2 in which the hardened relatively thick covering is an electrically insulating, thermosetting silicone epoxy.

4. An adjustable voltage autotransformer comprising a coil having a commutating surface formed thereon corresponding to a path of movement of a brush movable on said commutating surface in electrical engagement therewith, said coil comprising an annular closed core of magnetic material, a length of conducting wire having an insulation layer thereover wound on said core to form a plurality of winding turns, at least some of said winding turns having a similar portion with interstices between the portions, each of said similar portions having a face of the conductor and a face of the insulation layer surrounding the face of the conductor, a hardened relatively thick covering on an area of said coil including and adjacent to at least the similar portions to substantially fill the interstices and formed of curved thermosetting electrically insulating material, said covering having a face surrounding the face of the insulation layer and forming a contiguous covering except for the faces of the conductor and insulation layer, and a conducting material bonded to the face of the conductor and having an outer surface defining the commutating surface, the faces of the conductor, insulation layer and covering lying on a surface that is parallel to and below the commutating surface and normally being free of the core within the interstices.

5. The invention as defined in claim 1 in which the coating is formed by heating the coil, exposing said heated coil to particles of a thermosetting epoxy which became fused thereto and cooling said coil.

References Cited by the Examiner

UNITED STATES PATENTS

| | | | |
|---|---|---|---|
| 2,947,959 | 8/1960 | Polzella et al. | 336—149 X |
| 3,046,509 | 7/1962 | Wuczkowski | 336—205 X |
| 3,106,769 | 8/1963 | Goethe et al. | 29—155.56 |

LEWIS H. MYERS, *Primary Examiner.*

JOHN F. BURNS, ROBERT K. SCHAEFER, *Examiners.*

C. TORRES, *Assistant Examiner.*